United States Patent
Pelzers

(10) Patent No.: US 10,730,301 B2
(45) Date of Patent: Aug. 4, 2020

(54) METHOD OF CAPPING A NOZZLE FACE OF AN INK JET PRINT HEAD

(71) Applicant: Océ Holding B.V., Venlo (NL)

(72) Inventor: Ronald J. H. M. C. Pelzers, Horn (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 16/370,125

(22) Filed: Mar. 29, 2019

(65) Prior Publication Data

US 2019/0315126 A1    Oct. 17, 2019

(30) Foreign Application Priority Data

Apr. 12, 2018   (EP) ..................................... 18167070

(51) Int. Cl.
*B41J 2/165* (2006.01)
(52) U.S. Cl.
CPC .................................. *B41J 2/16505* (2013.01)
(58) Field of Classification Search
CPC .......... B41J 2/16505; B41J 2002/16558; B41J 2/16552; B41J 2/16526; B41J 2/165; C09D 11/34
See application file for complete search history.

(56) References Cited

U.S. PATENT DOCUMENTS

| | | | |
|---|---|---|---|
| 9,079,399 B2* | 7/2015 | Weijkamp | ................ B41J 2/175 |
| 2009/0237435 A1 | 9/2009 | Inoue | |
| 2010/0271424 A1 | 10/2010 | Cunnington et al. | |
| 2012/0019590 A1 | 1/2012 | Bansyo et al. | |

FOREIGN PATENT DOCUMENTS

| | | |
|---|---|---|
| EP | 2 803 489 A2 | 11/2014 |
| JP | 2006-281539 A | 10/2006 |
| JP | 2015-131419 A | 7/2015 |

OTHER PUBLICATIONS

European Search Report issued in Application No. 18 16 7070, dated Oct. 19, 2018.

* cited by examiner

*Primary Examiner* — Huan H Tran
(74) *Attorney, Agent, or Firm* — Birch, Stewart, Kolasch & Birch, LLP

(57) ABSTRACT

A method of capping a nozzle face of an ink jet print head comprises the step of ejecting an amount of ink from a nozzle opening within the nozzle face, so as to form an ink body covering the nozzle opening, adheringly suspended from a surrounding portion of the nozzle face.

20 Claims, 1 Drawing Sheet

METHOD OF CAPPING A NOZZLE FACE OF AN INK JET PRINT HEAD

FIELD OF THE INVENTION

The present invention relates to a method of protecting a nozzle face of an ink jet print head. The present invention further relates to a printing apparatus.

BACKGROUND ART

An ink jet print head has a nozzle face comprising at least one array of nozzle openings for jetting out droplets of ink in a printing process.

When an ink jet print head is not in use for a period of time, the nozzle face needs to be protected to keep the nozzle openings in an optimal condition for again jetting out droplets of ink when printing is resumed.

In case the nozzle face is left unprotected while an ink jet print head is inactive, ink inside an ink channel ending at a nozzle opening may disadvantageously interact with an environment of the print head. Ink may for instance dry out, or polymerize due to stray light from the environment, which may leave depositions inside the nozzle opening. Depending on the type of ink used, also, moisture from the environment may condense onto the nozzle face and interact with ingredients of the ink inside an ink channel to form depositions around a nozzle opening. Depositions inside and around a nozzle opening may adversely affect operation of the nozzle opening when printing is resumed, for instance by blocking the ejection of an ink droplet, or by causing an ejected ink droplet to be misdirected.

A known method of protecting a nozzle face comprises pressing a sealing member such as a capping sheet or a gasket against the nozzle face, so that the nozzle openings are sealed off from the environment. Such method is also known as capping. With this method, ink may remain on the sealing member after removal from the nozzle face. The remaining ink may age, and may for instance become sticky, and gather dust. Aged ink and dust may soil the nozzle face and clog up nozzle openings during further use of the sealing member for capping the nozzle face. As a consequence, a sealing member as described needs to be frequently cleaned.

Another known method comprises sealing off the nozzle face using a wet pad soaked with a soaking solution. With this method, fibers from the wet pad may get transferred to the nozzle face and then clog up nozzle openings. A wet pad needs to be replaced at times, and the soaking solution needs to be periodically refreshed.

Yet another known method comprises immersing the nozzle face in a liquid bath. With this method, liquid remaining on the nozzle face after removal of the print head from the liquid bath may contaminate a recording medium when printing is resumed, and may also affect the formation of ink droplets at a nozzle opening. Frequent cleaning of a nozzle face is therefore required to remove aged liquid from the nozzle face.

The present invention aims to provide an improved method of protecting a nozzle face of an ink jet print head during a period of inactivity. The present invention particularly aims to provide a protection method which is effective without adverse effects on the operation of a nozzle opening when printing is resumed. A further objective is to provide a method of protecting a nozzle face which can be relatively simply implemented.

SUMMARY OF THE INVENTION

According to an aspect of the invention, a method of protecting a nozzle face of an ink jet print head comprises the step of ejecting an amount of ink from a nozzle opening within the nozzle face, so as to form an ink body covering the nozzle opening, adheringly suspended from a surrounding portion of the nozzle face, wherein the ink comprises a phase-change ink which is ejected to form the ink body in a fluid state, wherein the method further comprises the step of allowing the ink within the ink body to cool down to a temperature below the phase change temperature.

An ink body covering a nozzle opening, suspended as described, provides a physical barrier between the environment of an ink jet print head and the ink inside an ink channel ending at the nozzle opening. Any interaction of ink with the environment will, as a result, take place at an interface of the ink body with the environment, away from the nozzle opening. Ink inside the ink channel is thereby protected against external influences which could form depositions inside or around a nozzle opening or which could in another way adversely affect operation of the nozzle opening when printing is resumed.

A phase change ink is an ink that is fluid at elevated temperatures and is semi-solid or solid at lower temperatures. The temperature at which the ink changes from fluid to semi-solid or solid is referred to as the phase change temperature. Above the phase change temperature, the ink is in a fluid state. In the fluid state, the ink may flow easily and may be suitably jetted using a print head. Below the phase change temperature, the ink may be in a semi-solid or solid state. In the semi-solid or solid state, the ink may hardly flow or not flow at all. In the semi-solid or solid state, the shape of the ink may be stable. Preferably, the phase change temperature is a temperature above room temperature.

When allowing the ink forming the ink layer to cool down to a temperature below the phase change temperature, then a stable layer of ink may be formed that protects the nozzles and ink inside the print head from the environment. The cooled layer of ink may form a protective layer, also referred to as ink body that seals off the nozzle opening until the ink body is removed again.

The ink may be a gelling ink. A gelling ink is an example of a phase change ink. The phase change temperature of a gelling ink is also referred to as gelling temperature. The viscosity of a gelling ink is temperature dependent. At elevated temperatures, i.e. temperatures above the gelling temperature, the viscosity of a gelling ink may be low and the ink may be fluid. Thus, at elevated temperatures, the ink may be suitably ejected to generate an ink body of a certain size and thickness, suspended from the nozzle face at a desired location.

At lower temperatures, i.e. temperatures below the gelling temperature, the viscosity of the ink may be low and the ink may be in a gelled state, which is an example of a semi-solid state. In the gelled state, the ink body may form a solid cap, which more reliably seals off the covered nozzle openings than when the ink is still in a fluid state.

The gelling property of the ink forming the ink body thus allows easy control over the viscosity of the ink layer through temperature control.

The temperature control of the ink may be performed using temperature control of the print head.

The step of allowing ink within the ink body to cool down to a temperature below the phase change temperature may comprise the step of allowing a heated part of the print head to cool down to a temperature below the phase change temperature. A body of ink having temperature-dependent properties may then assume a (semi-) solid state automatically as a result of the print head no longer being kept at an elevated temperature while the print head is in an inactive state.

The method may further comprise the step of promoting ink within the ink body to change phase back to a fluid state. Then, the ink body can be more easily removed when the nozzle face is to be uncapped at the end of a period of inactivity, for instance by the ink body being wiped from the nozzle face when the ink has become fluid.

Preferably, the step of allowing ink within the ink body to change phase back to a fluid state comprises heating up a part of the ink jet print head. A body of ink having temperature-dependent properties may then assume a fluid state automatically as a result of the print head being heated up again at the end of a period of inactivity.

Ink may be ejected from multiple nozzle openings within an array of nozzle openings, such that the amounts of ink ejected from individual nozzle openings within the array form a single ink body covering the array of nozzle openings, suspended from a portion of the nozzle face surrounding the array of nozzle openings. A single ink body covering multiple nozzle openings provides for multiple nozzle opening to be reliably sealed off from the environment.

Ink may also be ejected from multiple arrays of nozzle openings to form multiple ink bodies each covering one array of nozzle openings. This promotes the ink within an ink body to remain suspended below the array from which it was ejected, without blending with the ink ejected from a neighboring array to from a bigger ink body. Depending on the type of ink used, ink within a bigger ink body covering two neighboring arrays of nozzle openings could disadvantageously be inclined to collect at a central location, which could draw away ink from the two arrays to be covered. Furthermore, a bigger ink body could also inadvertently drip down from the print head.

BRIEF DESCRIPTION OF DRAWINGS

Other objects, features, and advantages of the present invention will become more apparent from the following detailed description when read in conjunction with the accompanying drawings, in which.

DETAILED DESCRIPTION OF EMBODIMENTS

Figure 1:
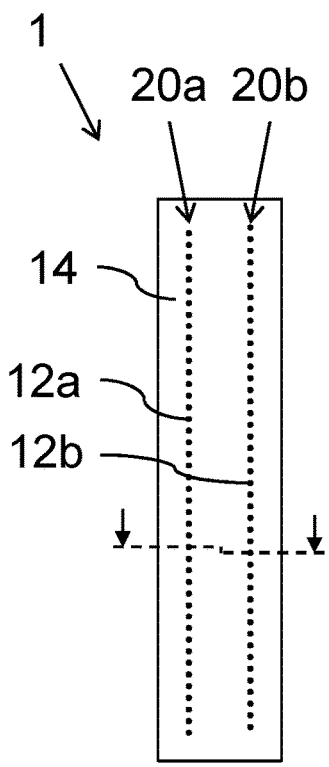
FIG. 1 is a bottom view of a print head, showing schematically a nozzle face comprising two neighboring arrays of nozzle openings.

With reference to FIG. 1, an ink jet print head 1 has a nozzle face 14 comprising two neighboring arrays 20a, 20b of nozzle openings 12a, 12b for jetting out droplets of ink in a printing process.

Figure 2:
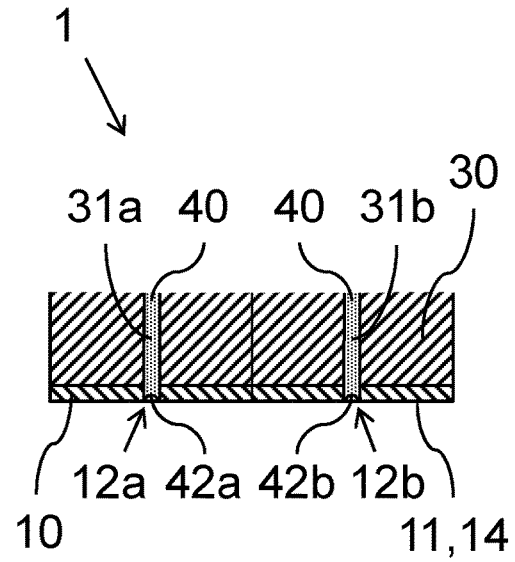
FIG. 2 is a cross sectional view of the print head of FIG. 1, showing schematically a nozzle plate having a bottom surface forming the nozzle face, provided on the bottom face of a channel body having ink channels for feeding ink towards the nozzle openings in the nozzle face.

With reference to FIG. 2, the print head 1 comprises a nozzle plate 10 having a bottom surface 11 forming the nozzle face 14. The nozzle plate 10 is provided on the bottom face of a channel body 30 having ink channels 31a, 31b for feeding ink 40 towards the nozzle openings 12a, 12b, wherein each ink channel 31a, 31b is associated with one of the nozzle openings 12a, 12b.

FIG. 2 shows the print head 1 in an unprotected state, in which the ink 40 within each ink channel 31a, 31b forms a meniscus 42a, 42b at a nozzle opening 12a, 12b. Such a meniscus 42a, 42b forms an interface with an environment of the print head 1, which is susceptible to influences that could locally cause depositions to be formed within or along the edge of the nozzle opening 12a, 12b if the nozzle face 14 is left uncapped while the print head 1 is inactive.

According to the invention, the formation of depositions at a nozzle opening 12a, 12b is prevented by sealing off the nozzle opening 12a, 12b from the environment with the use of ink 40.

Figure 3A:
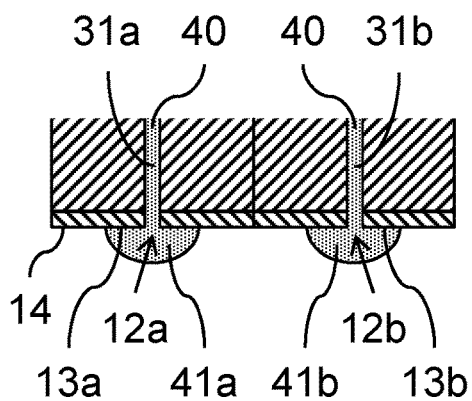
FIG. 3a is the view of FIG. 2, after ink has been ejected from respective nozzle openings to form bodies of ink in a fluid state, adheringly suspended from portions of the nozzle face surrounding the nozzle openings.

With reference to FIG. 3a, when the print head 1 is not going to be used for a period of time, ink 40 in a fluid state is fed through each of the ink channels 31a, 31b, such that an amount of ink 40 is ejected from each nozzle opening 12a, 12b within each array 20a, 20b of nozzle openings 12a, 12b.

The ink 40 is ejected at a relatively slow speed, such that an amount of ink 40 ejected from a respective nozzle opening 12a, 12b is allowed to wet a portion 13a, 13b of the nozzle face 14 surrounding said nozzle opening 12a, 12b, and to thereby form a body 41a, 41b of ink 40 covering the nozzle opening 12a, 12b, adheringly suspended from said surrounding portion 13a, 13b of the nozzle face 14.

Figure 3B:
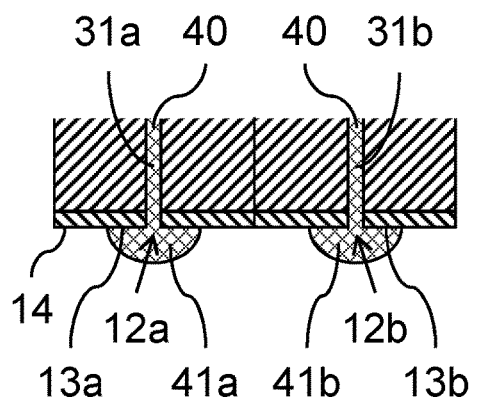
FIG. 3b is the view of FIG. 3a, showing the ink bodies at a time at which the ink within the ink bodies has changed phase to a more solid state.

With reference to FIG. 3b, after formation of a respective body 41a, 41b of ink 40 in a fluid state, the ink body 41a, 41b can be left such that ink 40 within the ink body 41a, 41b changes phase to a more solid state. According to a preferred embodiment of the invention, the phase change comprises the gellification of ink 40 within the ink body 41a, 41b, after the ink 40 was ejected in a fluid state below the gelling temperature.

With all of the ink 40 contained by an ink body 41a, 41b covering a respective nozzle opening 12a, 12b in a fluid state, an ink body 41a, 41b can already act as a physical barrier shielding at least ink 40 at the nozzle opening 12a, 12b from influences coming from the environment.

With ink 40 contained by an ink body 41a, 41b in a more solid state, an ink body 41a, 41b can also provide a more permanent shield from the environment, wherein the ink body 41a, 41b acts more as a physical member sealing off a nozzle opening 12a, 12b, until the ink body 41a, 41b is removed again from the nozzle face 14.

With further reference to FIG. 3b, it is noted that in practice, a phase change of ink 40 within an ink body 41a, 41b into a (semi-) solid state may be accompanied by a phase change of ink 40 within an ink channel 31a, 31b into a (semi-)solid state. For instance in the case of solidification due to a decrease of temperature of the print head 1 or in the case of gellification of ink 40 from a fluid state into a gel due to ink 40 no longer being forced to flow out from the nozzle openings 12a, 12b under a certain stress, ink 40 within the ink bodies 41a, 41b will be inclined to become (semi-) solid together with the ink 40 still inside the ink channels 31a, 31b.

Figure 4:
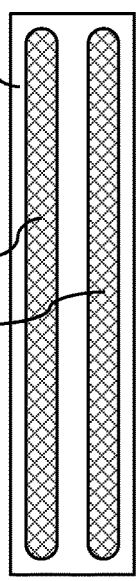
FIG. 4 is the view of FIG. 1, showing two bodies of ink each adheringly suspended from a portion of the nozzle face surrounding a whole array of nozzle openings.

With reference to FIG. 4, ink 40 can be ejected from each of the individual nozzle openings 12a, 12b within each array 20a, 20b of nozzle openings 12a, 12b, such that the amounts of ink 40 ejected from the plurality of nozzle openings 12a, 12b within each array 20a, 20b blend together to form a larger ink body 41a, 41b covering the whole array 20a, 20b of nozzle openings 12a, 12b, suspended from a portion 13a, 13b of the nozzle face 14 surrounding said whole array 20a, 20b.

As illustrated, ink 40 ejected from separate arrays 20a, 20b of nozzle openings 12a, 12b is preferably ejected in such a way, that separate larger ink bodies 41a, 41b are formed, each covering the array 20a, 20b of nozzle openings 12a, 12b from which the ink 40 within the respective ink body 41a, 41b was ejected.

An ink suitable for the described application comprises a phase change ink.

An ink 40 as described may be ejected at a higher temperature to form an ink body 41a, 42b, and then be left to cool down such that ink 40 within the ink body 41a, 41b changes phase by solidifying as a result of the change in temperature. Ejecting the ink 40 at a higher temperature may be performed by having a part of the print head 1 such as the channel block 30 heated up. Leaving an ink body 41a, 41b such that the ink 40 within the ink body 41a, 41b changes phase to a (semi-)solid state may in such a case be accompanied by letting said part of the print head 1 cool down.

A particular example of an ink suitable for the described application is an ink having gelling properties, which has a lower viscosity at certain higher temperatures, and which has a higher viscosity at certain lower temperatures. A low viscosity at a higher temperature allows droplets of ink to be jetted out from the nozzle openings 12a,12b in a fluid state. A high viscosity at a lower temperature allows droplets of ink deposited on a recording medium to remain relatively self-contained in a more solid state on the recording medium before being submitted to a curing process, with relatively little chance of coalescence with neighboring droplets.

A temperature at which a gelling ink is ejected from the nozzle openings 12a, 12b to form an ink body 41a, 41b may be a temperature below a temperature required for jetting out droplets of ink in a printing process, in order for the ink 40 to be more viscous at the time of forming an ink body 41a, 41b than at the time of printing. After finishing a printing process, one may wait for a temperature of the print head 1 to decrease from the temperature required for printing to the desired ejection temperature.

After having functioned as a temporary protective layer while the print head 1 is inactive, an ink body 41a, 41b can be removed again from the nozzle face 14 by wiping. Depending on the degree of solidity of the ink 40 within the ink body 41a, 41b, first, a part of the print head 1 such as the channel body 30 can again be heated up to a certain temperature in order for the ink 40 within the ink body 41a, 41b to become fluid, to facilitate the wiping of a ink 40 having temperature dependent properties. Especially in the case of a gelling ink, before wiping, an amount of ink 40 may be forced out of the ink channels 31a, 31b in order for at least part of the ink 40 within an ink body 41a, 41b to be already removed or refreshed, so that any collected solids within the ink body 41a, 41b can be gotten rid of before being wiped along the nozzle face 14. After wiping, ink droplets can again be jetted out from the nozzle openings 12.

In summary, the invention provides a relatively simple way of temporarily protecting the nozzle face of an ink jet print head without the use of a physical capping member, by temporarily covering the nozzle face with a body of ink. Within the scope of this invention, the use of a thermo-reversible gelling ink is specifically advantageous. Such an ink can be controlled to act more as a fluid or more as a solid through control of the temperature. Below the gelling temperature, the ink, as a fluid, has a relatively high viscosity, which allows the ink to be ejected such as to form an ink body which is relatively self-contained. Below the gelling temperature, after the ejection of ink has ended, the ink within a formed ink body gellifies. When the ink forms a gel, the ink can be made fluid again either by exerting a certain stress, or by increasing the temperature. At a temperature higher than the gelling temperature, or outside a range of temperatures defining a gradual transition between a high viscosity at lower temperatures and a low viscosity a higher temperatures, the ink is significantly more fluid, without any inclination to gellify in case any stress exerted on the ink is too low.

A printing apparatus comprising an ink jet print head may comprise a controller configured to aid in performing the method, by providing an operative mode to purge out, at a certain speed and temperature, a specific amount of ink from the various nozzle openings available, such as to form an ink body of a certain size and volume suspended from the nozzle face, covering one or more nozzle openings.

The specific amount will need to be tailored to the properties of both the ink and the nozzle face, such that the ejected ink, by being purged out at the certain speed, will form an ink body adhering to a portion of the nozzle face surrounding the respective nozzle openings without dripping down from the print head.

The ink, in turn, will need to have a certain viscosity in order to behave in the desired way. It is noted that inks with gelling properties, having, at certain temperatures, a viscosity much higher than that of non-gelling inks, are suitable for the desired application as a result of their tendency of forming ink bodies that are, to a large extent, self-contained. Such an ink body can locally stick to a nozzle face in order to cover a nozzle opening, thereby protecting the nozzle opening from environmental influences. The fluid of a non-gelling ink, on the other hand, would be more inclined to spread out over a nozzle face, forming a thin distributed layer of ink, rather than a thick localized body. Also, the fluid of a non-gelling ink would be more inclined to be sucked back into a nozzle opening due to a vacuum applied within a ink reservoir feeding into the associated ink channel, which would leave the ink inside the ink channel unprotected from the environment.

The size of an ink body required for performing a method according to the invention will depend on the type of ink, and on the extent to which an ink body of a certain size will be suitable to sufficiently protect the ink within an ink channel from external influences. In practice, each ink body may cover an area of a nozzle having a width of about twice the diameter of a nozzle opening, up to a width of several times that diameter. An ink body has been found to be small enough to prevent it from dripping down from a nozzle face when each array of nozzle openings in a nozzle face having multiple such arrays is covered by a separate ink body.

It is to be understood that the disclosed embodiments are merely exemplary of the invention, which can be embodied in various forms. Specific structural and functional details are not to be interpreted as limiting, but merely as a basis for the claims and as a teaching for one skilled in the art to variously employ the present invention in virtually any appropriately detailed structure. In particular, features presented and described in separate dependent claims may be applied in combination, and any advantageous combination of such claims is herewith disclosed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. Method of protecting a nozzle face of an ink jet print head, comprising the step of:
ejecting an amount of ink from a nozzle opening within the nozzle face, so as to form an ink body covering the nozzle opening, adheringly suspended from a surrounding portion of the nozzle face, wherein the ink comprises a phase-change ink which is ejected to form the ink body in a fluid state, wherein the method further comprises the step of allowing the ink within the ink body to cool down to a temperature below the phase change temperature.

2. The method according to claim 1, wherein the step of allowing ink within the ink body to cool down to a temperature below the phase change temperature comprises allowing a heated part of the ink jet print head to cool down to a temperature below the phase change temperature.

3. The method according to claim 1, further comprising the step of promoting ink within the ink body to change phase back to a fluid state after a phase-change of the ink into the more solid state.

4. The method according to claim 1, wherein the step of allowing ink within the ink body to change phase back to a fluid state comprises heating up a part of the ink jet print head to a temperature above the phase change temperature.

5. The method according to claim 3, further comprising the step of wiping the ink of the ink body from the nozzle face.

6. The method according to claim 1, wherein the ink has a temperature-dependent viscosity.

7. The method according to claim 6, wherein the ink is a gellink ink.

8. The method according to claim 1, wherein ink is ejected from multiple nozzle openings within an array of nozzle openings, such that the amounts of ink ejected from individual nozzle openings within the array form a single ink body covering the array of nozzle openings, suspended from a portion of the nozzle face surrounding the array of nozzle openings.

9. The method according to claim 1, wherein ink is ejected from multiple arrays of nozzle openings to form multiple ink bodies each covering one array of nozzle openings.

10. The method according to claim 1, comprising the step of waiting for a heated part of the print head to cool down before the amount of ink is ejected.

11. A printing apparatus comprising:
an ink jet print head, the ink jet print head comprising a nozzle opening within a nozzle face;
a phase-change ink; and
a controller, wherein the controller is configured to control the printing apparatus to perform the steps of:
ejecting an amount of the phase-change ink from the nozzle opening within the nozzle face, so as to form an ink body covering the nozzle opening, adheringly suspended from a surrounding portion of the nozzle face, wherein the phase-change ink is ejected to form the ink body in a fluid state; and
allowing the ink within the ink body to cool down to a temperature below the phase change temperature.

12. The printing apparatus according to claim 11, wherein the step of allowing ink within the ink body to cool down to a temperature below the phase change temperature comprises allowing a heated part of the ink jet print head to cool down to a temperature below the phase change temperature.

13. The printing apparatus method according to claim 11, wherein the controller is further configured to control the printing apparatus to perform the step of promoting ink within the ink body to change phase back to a fluid state after a phase-change of the ink into the more solid state.

14. The printing apparatus according to claim 11, wherein the controller is further configured to control the printing apparatus to perform the step of allowing ink within the ink body to change phase back to a fluid state comprises heating up a part of the ink jet print head to a temperature above the phase change temperature.

15. The printing apparatus according to claim 13, wherein the controller is further configured to control the printing apparatus to perform the step of wiping the ink of the ink body from the nozzle face.

16. The printing apparatus according to claim 11, wherein the ink has a temperature-dependent viscosity.

17. The printing apparatus according to claim 16, wherein the ink is a gellink ink.

18. The printing apparatus according to claim 11, wherein the controller is further configured to control the printing apparatus to eject ink from multiple nozzle openings within an array of nozzle openings, such that the amounts of ink ejected from individual nozzle openings within the array form a single ink body covering the array of nozzle openings, suspended from a portion of the nozzle face surrounding the array of nozzle openings.

19. The printing apparatus according to claim 11, wherein the controller is further configured to control the printing apparatus to eject ink from multiple arrays of nozzle openings to form multiple ink bodies each covering one array of nozzle openings.

20. The printing apparatus according to claim 11, wherein the controller is further configured to control the printing apparatus to perform the step of waiting for a heated part of the print head to cool down before the amount of ink is ejected.

* * * * *